United States Patent [19]

Garrotta

[11] Patent Number: 4,914,636

[45] Date of Patent: Apr. 3, 1990

[54] METHOD AND DEVICE FOR ACQUISITION OF SEISMIC DATA

[75] Inventor: Robert J. Garrotta, Chatenay Malabry, France

[73] Assignee: Compagnie Generale De Geophysique, Massy, France

[21] Appl. No.: 260,279

[22] Filed: Oct. 20, 1988

[30] Foreign Application Priority Data

Oct. 20, 1987 [FR] France ................................ 87 14437

[51] Int. Cl.$^4$ ............................................. G01V 1/20
[52] U.S. Cl. ....................................... 367/56; 367/49; 181/111; 181/112
[58] Field of Search ........................ 367/20, 48, 23, 49, 367/56, 58, 62, 41; 181/111, 112

[56] References Cited

U.S. PATENT DOCUMENTS

| | | | |
|---|---|---|---|
| 3,351,899 | 11/1967 | Luchraenn et al. | 367/23 |
| 3,885,225 | 5/1975 | Anstey et al. | 367/41 |
| 3,984,805 | 10/1976 | Silverman | 367/190 |
| 4,159,463 | 6/1979 | Silverman | 367/59 |
| 4,295,213 | 10/1981 | Mifsud | 367/41 |
| 4,707,812 | 11/1987 | Martinez | 367/49 |
| 4,715,020 | 12/1987 | Landrum, Jr. | 367/48 |
| 4,715,021 | 12/1987 | Dittert | 367/41 |

FOREIGN PATENT DOCUMENTS 2279115 2/1973 France .
2145552 2/1976 France .

Primary Examiner—Thomas H. Tarcza
Assistant Examiner—Ian J. Lobo
Attorney, Agent, or Firm—Blakely, Sokoloff, Taylor & Zafman

[57] ABSTRACT

In a method of acquiring seismic data in a prospecting area, an array of excitation vibration receivers is placed on or over the terrestrial surface. A plurality of excitation vibration sources is disposed in the vicinity of the array, each source emitting excitation vibrations with a frequency spectrum in a specific frequency band. These bands are adjacent and together cover the frequency band of usable seismic data signals. When the excitation vibrations are emitted by the plurality of sources, the excitation vibration echoes reflected from strata beneath the terrestrial surface are registered by the receivers. The above steps are repeated for a plurality of successive trace increment displacements to produce an emission figure and to cover the prospecting area. The method and the device implementing it can be used for acquisition of terrestrial or marine seismic data.

20 Claims, 7 Drawing Sheets

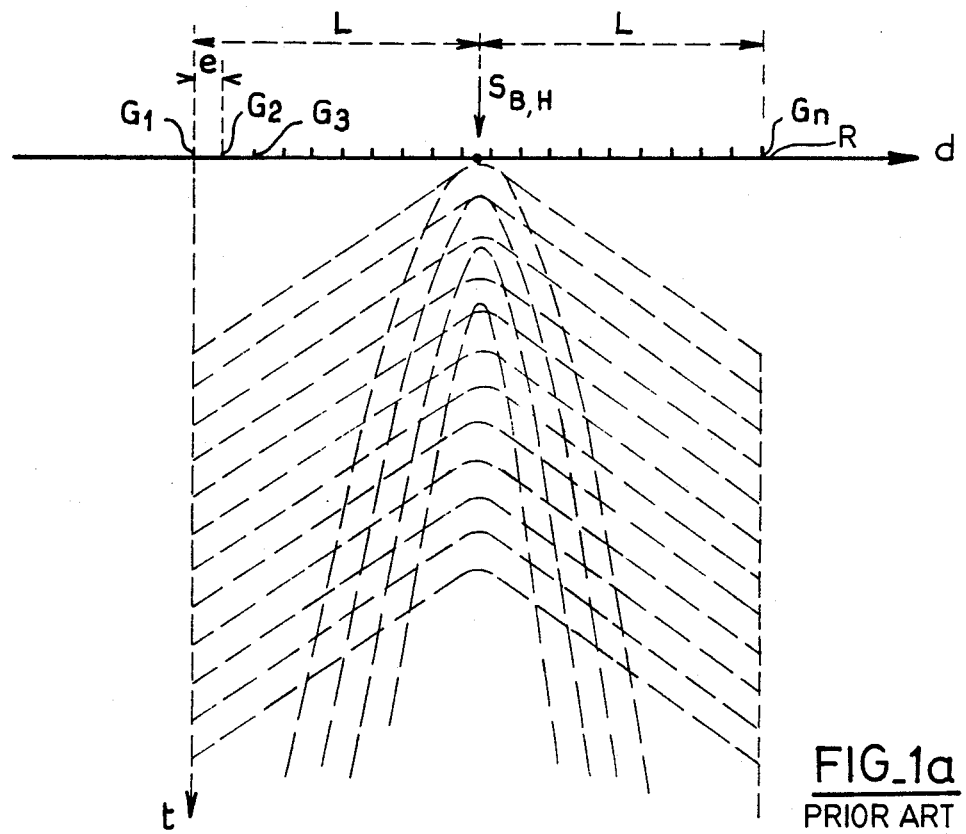
FIG_1a PRIOR ART
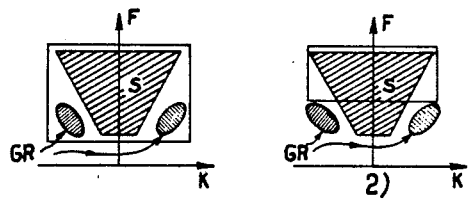
FIG_1b PRIOR ART

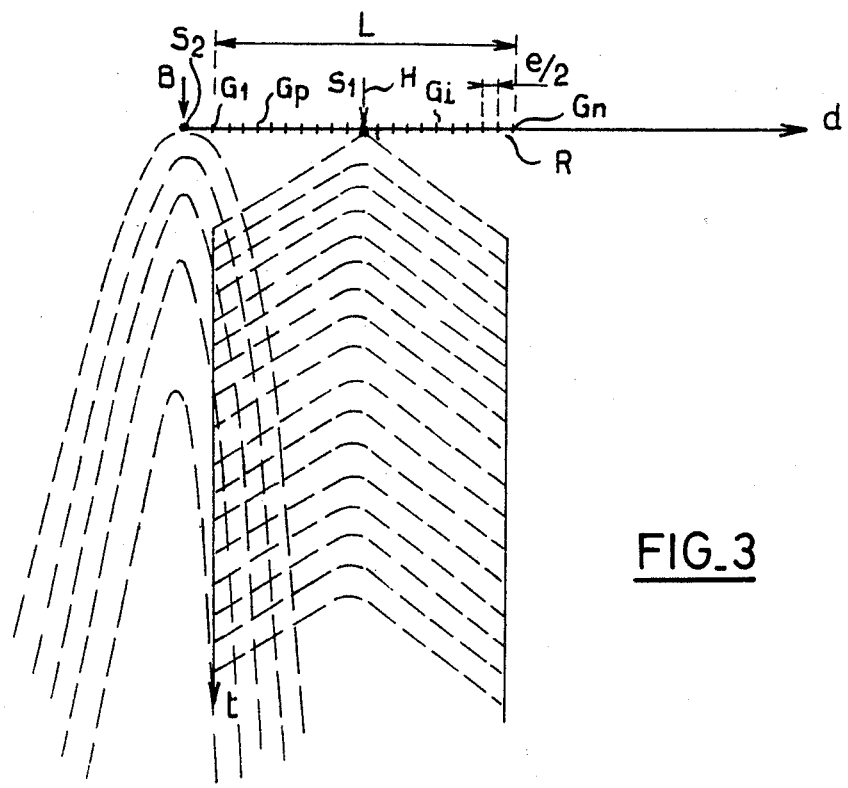
FIG_3
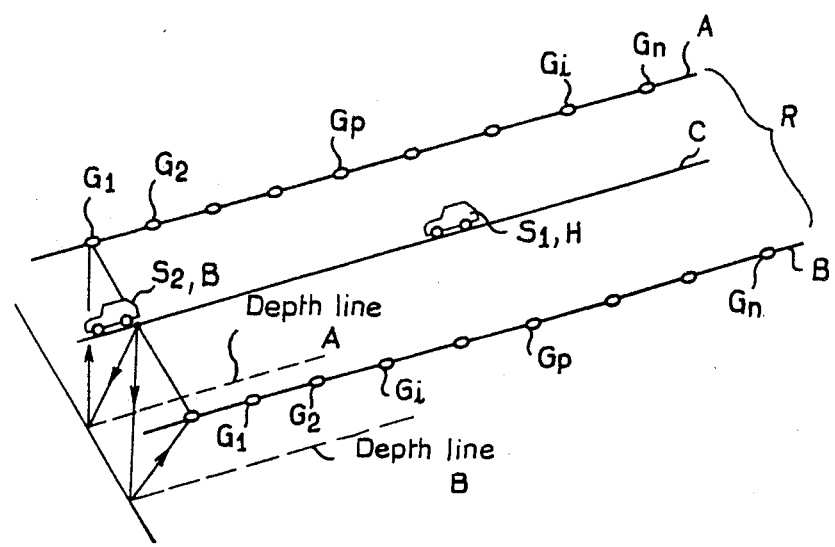
FIG_4a

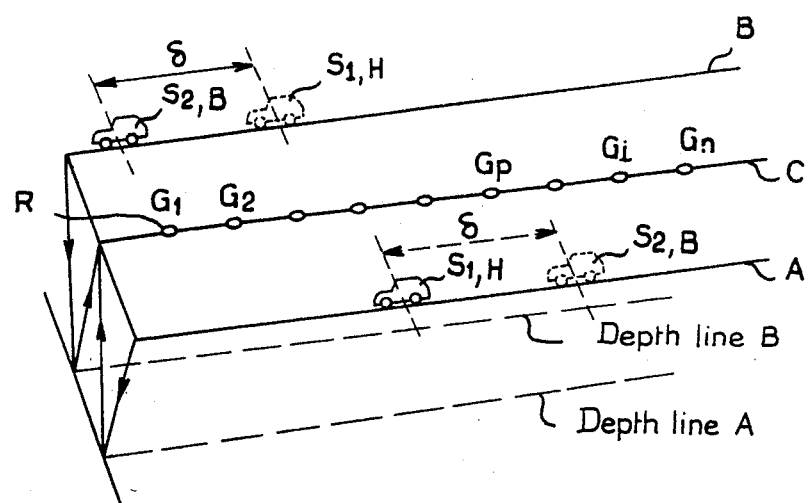
FIG_4b
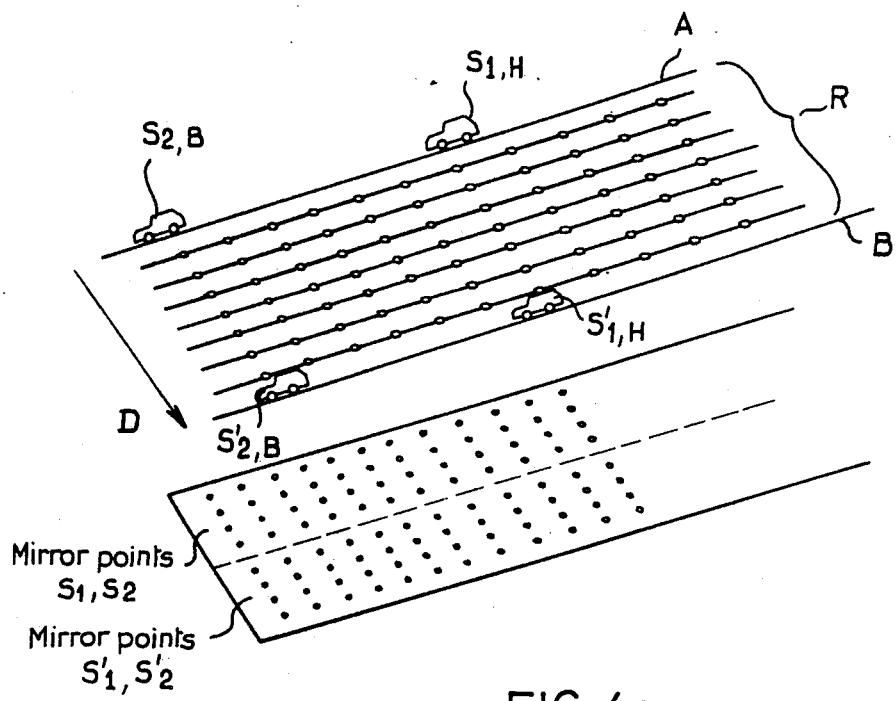
FIG_4c

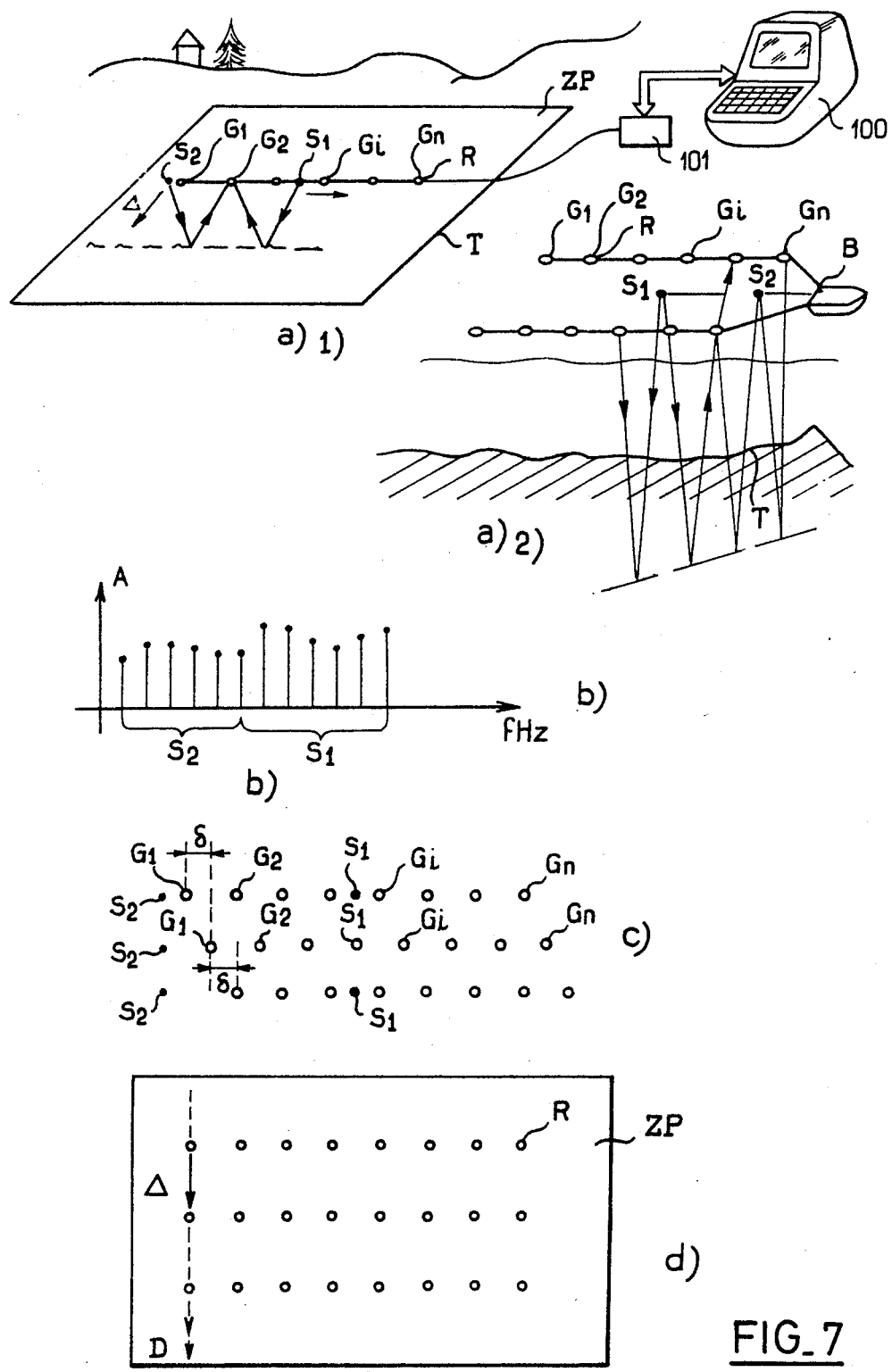
FIG_7

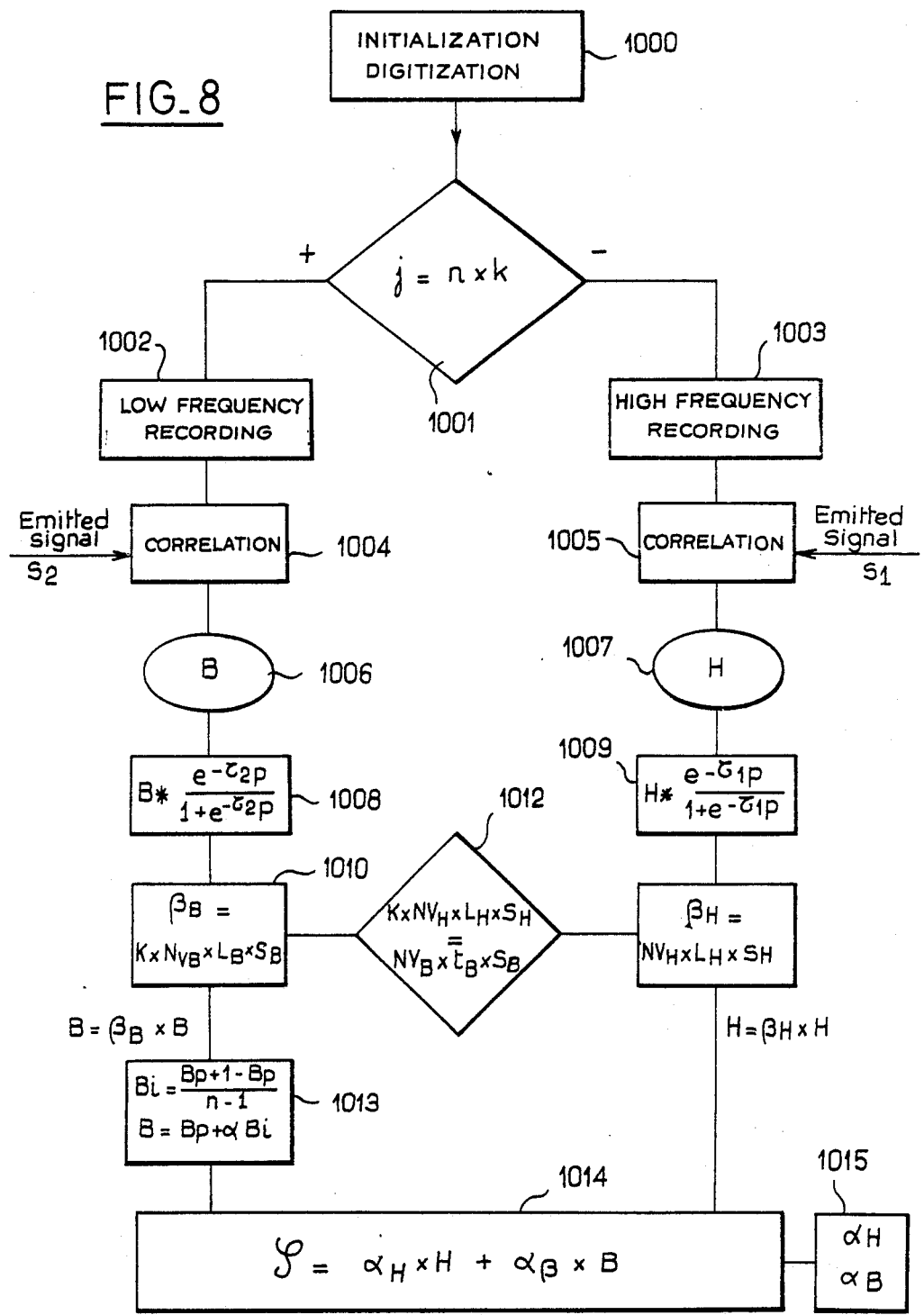
FIG_8

METHOD AND DEVICE FOR ACQUISITION OF SEISMIC DATA

BACKGROUND OF THE INVENTION

1. Field of the Invention

The invention concerns a method and device for acquisition of seismic data.

2. Description of the Prior Art

Seismic data is currently acquired in a prospecting area by means of an array of receivers disposed on or over the terrestrial surface in the prospecting area. A series of firings is executed to generate excitation vibrations, hereinafter referred to simply as vibrations, the vibrations generated propagating towards the underlying terrestrial strata and being reflected therefrom. A single source having a vibration emission frequency spectrum covering the usable signal range, which is a frequency range or band between 10 Hz and 60 Hz, is usually employed.

For a single-row array R as shown in FIG. 1a in which the geophones or groups of geophones G1, G2 are spaced by a distance e, the single frequency band source S is placed at the center of the array R and the maximum distance to the end geophone (the "remote-on" distance) is designated L.

The time-distance diagram of vibration echoes reflected by underlying terrestrial strata as shown in FIG. 1a representative of the group propagation speed of the reflected vibrations features, for the geophones or groups of geophones disposed in the vicinity of the source S and because of saturation at the low-frequency components of the latter, a disturbance due to the slow waves corresponding to the vibrations with low propagation speed, which are therefore steeply inclined in the FIG. 1a diagram. The effect of this disturbance is to mask and jumble with low-frequency noise the response to the high-frequency vibration components of the geophones or groups of geophones situated in the vicinity of the source S, these high-frequency components being much less steeply inclined in the FIG. 1a diagram.

An advantageous representation as in FIG. 1b of the relative levels of the low-frequency noise signals and the usable signal S in a frequency-time domain of the spectrum of the emitted vibrations, spatial frequency or spatial wave number K and spatial resolution of the array shows that the low-frequency noise level denoted GR corresponds to a maximum relative level of the signal between 0 dB and −5 dB in the corresponding F, K(GR) domains whereas the corresponding level in the corresponding F, K(S) domain, which is substantially trapezium-shaped, corresponds to a corresponding relative level between −10 dB and −30 dB. Including the noise signal in a processing domain corresponding to the rectangle of FIG. 1b diagram (1) therefore raises the problem previously explained with reference to FIG. 1a.

A first solution to this problem might consist in temporal frequency filtering of the signals received by the geophones in response to the vibrations, as represented by the smaller rectangular domain of FIG. 1b diagram (2). Although this solution retains the maximal spatial resolution for the high-frequency signals, it has the disadvantage of limited temporal frequency response with corresponding loss of information.

Another solution to this problem might consist, as shown in FIG 1b diagram (3), in retaining all temporal frequency components of the signals received by the geophones in response to the vibrations. However, this could only be achieved at the cost of reducing the distance resolution of the array corresponding to the lower spatial wave number limit of the noise domain GR.

As shown in FIG. 1b diagram (4), an intermediate solution might consist in limiting both the usable signal component frequency band and the spatial resolution of the array. However, this solution also leads to global loss of information from the echo signals.

An object of the invention is to remedy the aforementioned disadvantages by employing a method whereby it is possible both to retain the vibration component frequency band and to increase the spatial resolution of the array of receivers.

Another object of the present invention is to provide a method offering improved spatial resolution performance from the same quantity of equipment as in the prior art methods.

A further object of the invention, given the use of the same transmission-reception equipment as in the prior art methods, is the use of operating conditions that are similar from the points of view of the vibration force applied and the quantity of information acquired per trace.

SUMMARY OF THE INVENTION

In one aspect the invention consists in a method of acquiring seismic data in a prospecting area comprising, in order to establish a trace, the steps of:

(a) disposing on or over the terrrestrial surface in said prospecting area an array of vibration receivers;

(b) disposing in the vicinity of said array a plurality of vibration sources each adapted to emit vibrations with a frequency spectrum in a specific frequency band, the frequency bands of the spectra of said sources being adjacent and together covering the frequency band of usable seismic data signals;

(c) emitting vibrations with different frequency spectra from said plurality of sources;

(d) recording said vibrations after reflection from strata beneath the terrestrial surface by means of said receivers;

(e) moving said sources relative to said array in an acquisition direction by a trace displacement increment; and (f) repeating the above steps (c), (d) and (e) for a plurality of successive movements by said trace displacement increment.

In another aspect, the present invention consists in a device for acquisition of seismic data in a prospecting area comprising on or over the terrestrial surface in said prospecting area:

an array of vibration receivers; and a plurality of vibration sources each adapted to emit vibrations with a frequency spectrum in a specific frequency band, the frequency bands of the spectra of said sources being adjacent and together covering the frequency band of usable seismic data signals.

The method and device in accordance with the invention find applications in terrestrial and marine geophysical prospecting for two- and three-dimensional, single- and multirow, single- and multisource surveys.

The invention will be better understood from the following description of various embodiments of the invention given by way of non-limiting example only and with reference tot he appended diagrammatic drawings.

BRIEF DESCRIPTION OF THE DRAWINGS

FIGS. 1a and 1b relate to the prior art.

FIG. 3 shows a two-dimensional acquisition diagram for a trace corresponding to one specific embodiment of the invention.

FIG. 4a shows the method in accordance with the invention in the case of multirow two-dimensional acquisition.

FIG. 4a shows the method in accordance with the invention in the case of multisource two-dimensional acquisition.

FIG. 4c shows the method in accordance with the invention in the case of three-dimensional acquisition.

FIGS. 7 and 8 show by way of non-limiting example how the acquired data is processed.

DESCRIPTION OF THE PREFERRED EMBODIMENTS

The method in accordance with the invention for acquiring seismic data will first be described in general terms with reference to FIG. 2.

Figure 2:
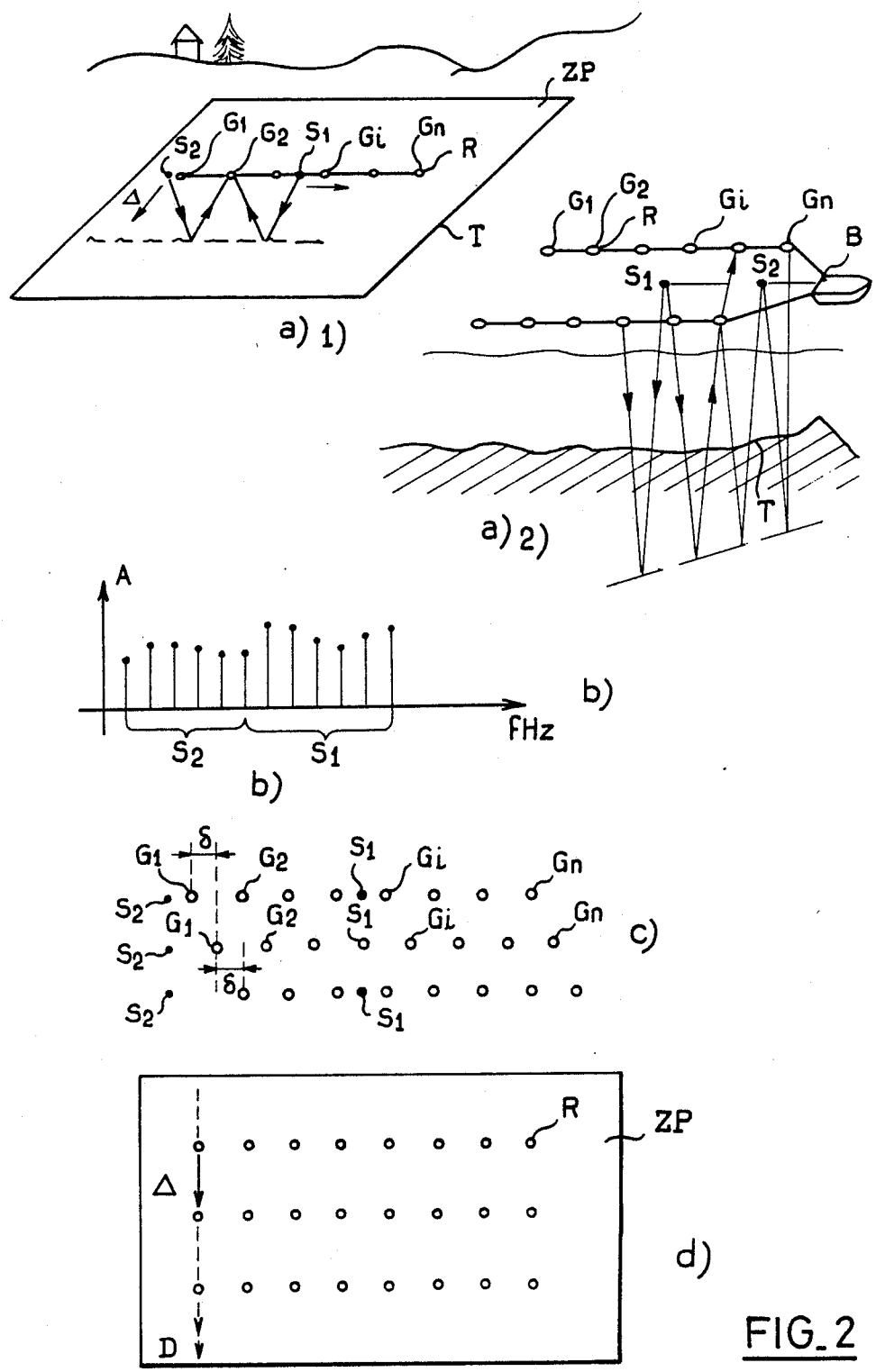
FIG. 2 is a diagram showing the various steps of the method in, accordance with the invention.

Referring to the aforementioned figure, the method in accordance with the invention comprises, in order to establish a trace, disposing on or over the terrestrial surface denoted T in FIG. 2 diagrams (a) (1) and (a) (2) in a prospecting area ZP an array R of vibration receivers.

It is to be understood that by terrestrial surface is meant either the ground as shown in FIG. 2a diagram (1), the array R being placed on the ground in the prospecting area ZP or, as shown in FIG. 2a diagram (2), the sea bed, the array of vibration receivers floating on the surface of the sea and being towed by a boat B, and that the method in accordance with the invention applies to the acquisition of terrestrial and marine seismic geophysical data.

As also shown in FIG. 2a diagrams (1) and (2), the method in accordance with the invention further consists in disposing a plurality of vibration sources in the vicinity of the array R. Each source is adapted to emit vibrations with a frequency spectrum in a specific frequency band. The frequency bands of the spectra of the sources are substantially adjacent and together cover the frequency band of usable seismic data signals. In FIG. 2a diagrams (1) and (2), two sources are shown, but it is to be understood that the method in accordance with the invention can be used with a larger number of sources employed.

FIG. 2b shows the frequency spectrum of a first source emitting vibrations with a frequency spectrum in a high frequency band and a second source emitting vibrations with a frequency spectrum in a low frequency band. The diagram in FIG. 2b shows the spectral components of the vibrations in terms of amplitude and frequency. It is to be understood that the frequency bands of the spectra of the sources are adjacent in the sense that they overlap in frequency by not more than 10% of the width of each of the frequency bands in question.

The method in accordance with the invention consists in emitting from the plurality of sources S1, S2 in FIG. 2a diagram (1) vibrations with different frequency spectra and recording by means of the receivers G1, G2, Gi, Gn the vibrations reflected from the strata underlying the terrestrial surface T.

The previous steps having been carried out for one position of the aforementioned sources relative to the array R, the next step involves relative movement of the sources and the array in the profile acquisition direction, which is materialized by the alignment of the sources of the array R. Thus as shown in FIG. 2c the sources are moved relative to the array R by a displacement increment $\delta$ in the direction in which the receivers G1, Gi, Gn are aligned so as to produce, for a plurality of successive displacements of one displacement increment, an emission figure as shown in FIG. 2c. FIG. 2c shows the displacement of the sources relative to the array R in three successive displacements by the increment $\delta$.

The steps consisting in emitting from the plurality of sources vibrations with different frequency spectra, recording the vibrations reflected by the strata underlying the terrestrial surface by means of the receivers G1, G2, Gi, Gn and moving the sources relative to the array R in the profile acquisition direction by one trace displacement increment are of course repeated.

According to one advantageous characteristic of the method in accordance with the invention, the vibrations with different frequency spectra are emitted by the plurality of sources S1 and S2 synchronously.

Of course, to cover all or part of the prospecting area ZP, the method in accordance with the invention also entails, as shown in FIG. 2d, moving the array R and the sources by a displacement increment $\Delta$ in the direction of advance D. Following each displacement by a displacement increment $\Delta$ in the direction of advance D the array R and the sources S1, S2 are disposed as previously.

A more detailed description will now be given with reference to FIG. 3 of the theory of the seismic data acquisition method in accordance with the invention, in the case where two sources S1, S2 are used. The array R is assumed to include at least one row of receivers G1, G2, Gi, Gn regularly spaced in the trace or profile acquisition direction d.

The method in accordance with the invention entails placing the high-frequency first source S1, for which the vibration component emission spectrum is in the high frequency band, substantially at the center of the array R.

The low-frequency second source, for which the vibration component spectrum is in the low frequency band, is then disposed in the vicinity of the end of the array R.

FIG. 3 shows on a two-dimensional diagram of time (t) plotted as a function of distance (d) the various echo amplitude shapes relating to the high-frequency vibrations emitted by the source S1 and the low-frequency vibrations emitted by the source S2.

It will be noted that the low-frequency echoes and the noise generated by these echoes following emission from the low-frequency source S2, these echo signals being low-speed signals, are shifted relative to the echo signals of the vibrations generated by the high-frequency source S1, these high-frequency echo signals being of much higher speed. Because of this, the low-frequency noise inherent to emission in the low frequency band of the emission source is substantially limited to the receivers G1, G2, Gp situated at the end of the array, the receivers corresponding to the central part of the array and the end of the array opposite the end in whose vicinity the low-frequency source S2 is located being exempt from any low-frequency noise.

Thus virtually all the receivers of rank higher than Gp can provide high-frequency echo information virtually free of low-frequency noise. This information is usable information that can be exploited given the absence of low-frequency noise. Thus although the receivers G1, Gp situated near the low-frequency source S2 are still subject to the problem of saturation by the low-frequency signals generated by the source S2, so that their dynamic range is limited for the high-frequency signals generated by the source S1, the sensors of rank greater than Gp in the vicinity of the center of the array R and therefore situated near the high-frequency source S1 are best able to capture the high-frequency content of the echo signals.

With this arrangement, the high-frequency echo signals can be perceived bilaterally by receivers situated in the central part of the array R, which cannot be the case with a single source placed at the end of the array.

As will also be noted in FIG. 3, the low-frequency second source S2 may be offset towards the outside of the array relative to the end in question.

As will also be noted in FIG. 3, the spacing between the receivers G1, G2, Gp, Gi, Gn may advantageously be e/2 where e represents the spacing of prior art method receivers on a trace acquisition line aligned with the direction d. Thus for the same quantity of equipment in terms of the number of receivers as when using the prior art acquisition system, in the method in accordance with the invention the spatial resolution of the array R at high frequencies, that is for the source S1, is doubled whereas the distance to the low-frequency source S2 at the opposite end of the array R, the remote-on distance, is unchanged and still equal to L.

It is therefore possible with the method in accordance with the invention to acquire seismic data with the same vibration force as in prior art devices, the same vibration force being obtained by distributing the duration and numbers of vibrations relative to the spatial sampling.

The method in accordance with the invention therefore makes it possible to raise the spatial cut-off frequency of the high-frequency transmission line and in some cases to eliminate it without reducing the necessary filtering of low-frequency noise.

The method in accordance with the invention may be employed with various acquisition modes, as will now be described with reference to FIGS. 4a, 4b and 4c.

Referring to FIG. 4a, in the case of two-dimensional multirow acquisition the array R comprises several parallel rows of receivers. The vibration sources are then disposed on a parallel line. The parallel rows of receivers are disposed on the lines A and B. On the central line C, in the conventional way, the sources S1 and S2 are represented on vehicles that are mobile to achieve the relative displacement of the sources relative to the array R to produce the emission figures. The synchronous firing or triggering of the sources S1, S2, which consist of vibrators as will be explained later in the description, is achieved in the conventional way.

On the other hand, in the case of two-dimensional multisource acquisition as shown in FIG. 4b, the multisource nature of the acquisition being conferred on it not by virtue of the division of the sources according to the frequency band of their emission spectrum but rather by virtue of the use of several sources the emission spectrum frequency bands of which are subdivided as previously described, the array R comprises a central row C of receivers and first and second parallel source displacement lines A and B.

In this case the high-frequency source S1 is placed on the first line A and the low-frequency source is placed on the second line B. In this case the first and second sources S1 and S2 are alternated after each trace displacement increment along the first and second lines A and B. In this manner, broadly speaking, after displacement of the source S1 and the source S2 by a trace increment $\delta$, the same source S1, respectively S2 has been shown in dashed outline and designated after the displacement S2, respectively S1. The change from a first type source, that is to say a high-frequency source, to a second type source, that is to say a low-frequency source, is achieved entirely by changing the waveform of the source control signal, as will be explained later in the description. The emission of vibrations with successively high-frequency and then low-frequency components on a line A, respectively B is therefore effected in an interleaved manner relative to the array R.

In the case of three-dimensional acquisition as shown in FIG. 4c, the array R comprises a plurality of parallel rows of receivers in a direction perpendicular to the direction of advance D. In this case the high-frequency sources S1 and S'1 and the low-frequency sources S2 and S'2 are respectively disposed in the vicinity of the center of the array R and at the end of the latter on two parallel lateral lines A and B. The vibrations generated by the sources S1, S2, S'1, S'2 can be fired or triggered in a partially synchronous way, that is to say with the sources S1, S2 first triggered synchronously and then the sources S'1, S'2, or totally synchronously, with the sources S1, S'1 and S2, S'2 triggered simultaneously. In the latter case, emission polarity or frequency coding may be used. FIG. 4c also shows the mirror points S1, S2 and the mirror points S'1, S'2 obtained when using the method in accordance with the invention.

Figure 5:
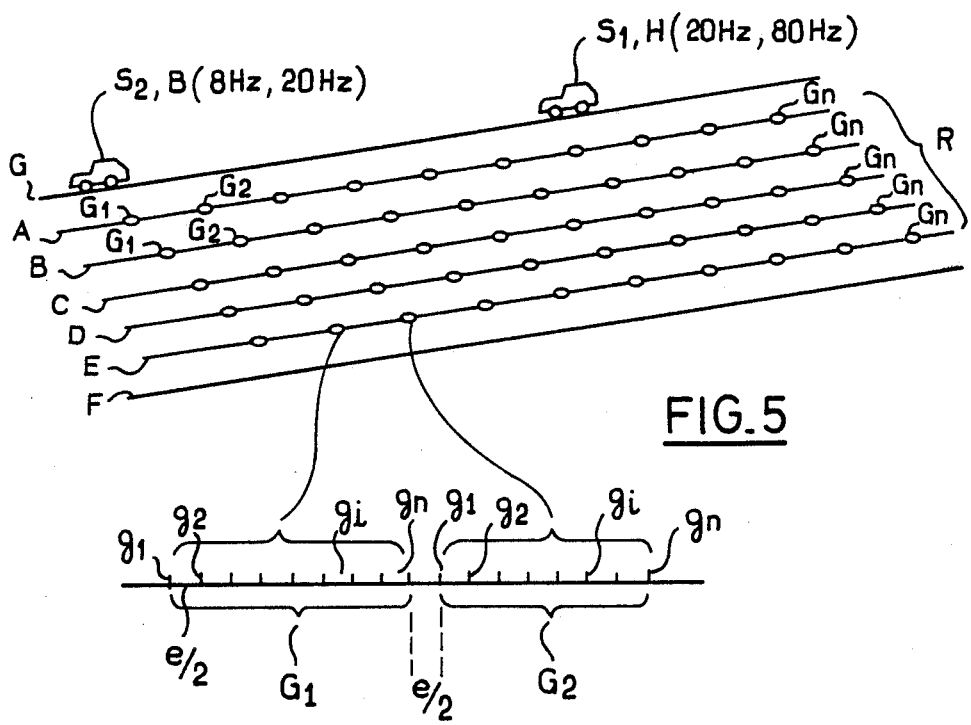
FIG. 5 is general diagram showing a seismic data acquisition device according to the invention.

A device in accordance with the invention for acquiring seismic data using the method as previously described will now be described with reference to FIG. 5.

As shown in the aforementioned figure, the seismic data acquisition device in accordance with the invention comprises, disposed on or over the terrestrial surface in the prospecting area ZP, an array of vibration receivers R and a plurality of vibration sources S1, S2. Each of the sources S1, S2 is adapted to emit vibrations with a frequency spectrum in a specific frequency band. The frequency bands of the sources are adjacent and together cover the frequency band of usable seismic data signals.

The array R of receivers may advantageously be a single-row or multirow array.

The plurality of sources preferably comprises a high-frequency first source S1, adapted to emit vibrations with a frequency spectrum in a frequency band between 20 Hz and 80 Hz. The plurality of sources also comprises a low-frequency second source adapted to emit vibrations with a frequency spectrum in a frequency band between 8 Hz and 20 Hz.

In the conventional way, each receiver G1, G2, Gi, Gn may be constituted by a group of interconnected geophones g1, g2 through gn. As shown in FIG. 5, the geophones g1, g2, gn are spaced from each other by a distance e/2 and each group of geophones constituting the receivers G1, G2 is also spaced from the others by the same distance e/2. Thus the array R is made up of equidistant rows of geophones the distance between which is equal to e/2. Note that the distance e/2 may be chosen to suit the conditions under which the data acquisition system in accordance with the invention is being used; for example, this distance may be 50 meters where the remote-on distance L is 2.4 km. The geophones g1, g2, gi, gn constituting the receivers G1 through G are of course interconnected to constitute a receiver sensing substantially the same vibration echo. The aforementioned geophones are connected in the conventional way, in series or in parallel, to one transmission channel of a conventional seismic transmission cable.

Figures 6A, 6B:
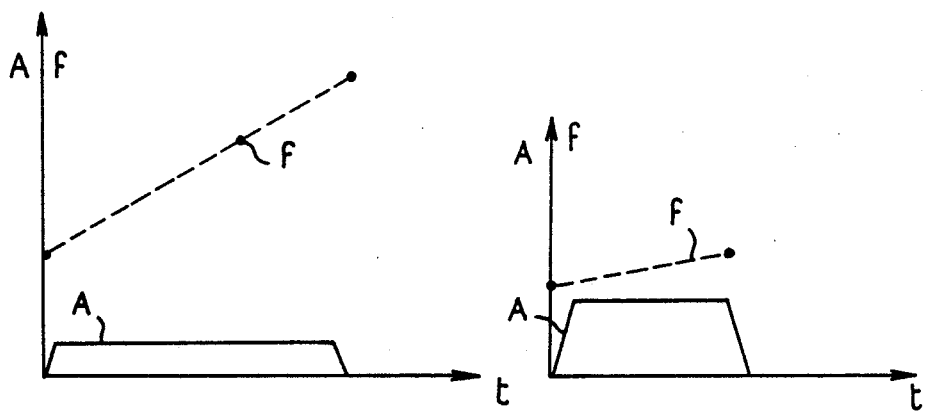
FIGS. 6a and 6b show waveforms of control signals for the first and second sources, respectively, adapted to generate vibrations with respective frequency spectra in a high frequency band and a low frequency band, where the sources comprise a vibrator.

A more detailed description of the waveforms of the control signals for the first and second sources to generate vibrations with frequency spectra in a high frequency band and in a low frequency band will now be given with reference to FIGS. 6a and 6b.

The aforementioned figures respectively show in continuous line and in dashed line the waveform amplitude (A) as a function of time and the vibration emission frequency variation (f) as a function of time. For both sources, emission is at constant amplitude during a particular time that can be different for the sources S1 and S2. The emission frequency varies continuously in the corresponding frequency band.

There have now been described a seismic data acquisition method and device offering particularly high performance in that the same quantity of transmission-reception equipment used to implement the method makes it possible to suppress low-frequency noise signals without requiring any temporal filtering directed to reducing the aforementioned noise level an without any corresponding reduction of the frequency band of usable signals in the low-frequency domain. It is, however, necessary to increase (double) the number of correlation channels, with one series of channels for the low-frequency signals and another series of channels for the high-frequency signals. Also, as previously explained, the method in accordance with the invention makes it possible to increase the spatial resolution of acquisition for the high-frequency signals by a factor of substantially two without reducing the remote-on distance, which corresponds to that in conventional type arrays.

One example of how the data acquired by the method in accordance with the invention as previously described is processed will now be given with reference to FIGS. 7 and 8.

For processing the aforementioned acquired data the device in accordance with the invention comprises as shown in FIG. 7a) digital processing means 100 and capture means 101 for the reflected vibrations according to their corresponding emission frequency bands. To give a non-limiting example, the capture means 101 may be constituted by a system for sampling the geophones Gi connected to the whole of the array R shown in FIG. 7a) at point 1 or 2. The sampling system 101 is of course connected to a fire control computer 100 for processing the digitized data. The sampling system 101 and the fire control computer 100 may be known type equipment enabling sampling at very high speed o a very large number of signals, namely the signals delivered by the aforementioned groups of geophones. The fire control computer 100 is of course provided with peripheral devices such as a display monitor, a control keyboard and auxiliary memories, for example.

The example of processing the digitized data obtained from the system 101 will be given with reference to the use of a high-frequency first source S1 and a low-frequency second source S2, it being understood that any number of sources may normally be used.

In the aforementioned case, the digital processing means 100 and capture means 101 comprise in the working memory of the computing means 100, as shown in FIG. 8, an initialization and digitization subroutine 1000 which controls the sampling system 101 directly.

Associated with the initialization and digitization subroutine 1000 are a subroutine 1001 and a subroutine 1002 controling the recording of reflected low-frequency vibrations with relatively less dense spatial sampling. Thus a plurality of geophones of the array R separated by a distance $n \times e$ where e represents the distance between two consecutive geophones are provided with a receive filter the passband of which corresponding substantially to the emission band of the low-frequency source S2. The other geophones at the distance e and disposed in the array R between two relatively less dense sampling geophones are provided with a receive filter the passband of which corresponds to the emission frequency band of the high-frequency source S1. The transfer function of the aforementioned two categories of filter may be qualitatively designated:

$$\frac{e^{-T2p}}{1 + e^{-T2p}} \quad (1)$$

in which 2 represents the time constant of the filter associated with the geophones providing the relatively less dense spatial sampling and $$\frac{e^{-T1p}}{1 + e^{-t1p}} \quad (2)$$

in which T1 represents the time constant of the filter associated with the geophones assuring the relatively more dense spatial sampling.

The geophones or groups of geophones assuring the relatively less dense spatial sampling are commanded by the subroutines 1001 and 1002 to record the low-frequency vibrations in step 1002, the corresponding digitized data being formed into a file after the aforementioned step 1002. It will be understood that the corresponding digitized data is of course recorded in the working memory of the fire control computer 100 at specific addresses when the address of the corresponding geophone (address is equal to a multiple of n, the coefficient k representing an integer between one and a specific value depending on the dimensions and configurations of the array.

The fire control computer 100 also comprises in its working memory, in addition to the aforementioned subroutine 1001, a subroutine 1003 for recording reflected high-frequency vibrations with the previously defined relatively more dense spatial sampling. In this case the geophones or groups of geophones recording the high-frequency vibrations are separated by a distance e as previously explained. Of course, if the address j of the corresponding digitized data delivered by the sampling system 101 is not equal to an integer multiple of n, the corresponding digitized data is memorized in step 1003 for constructing a reflected high-frequency vibration data file in step 1003 shown in FIG. 8.

To provide data usable more directly by the digitized data processing system consisting of the computer 101, the latter further comprises, as shown in FIG. 8, a first subroutine 1004 for correlating the reflected low-frequency vibrations recorded in the file 1002 with the emission signal of the low-frequency source S2 to generate a plurality of correlated low-frequency data B put into a file 1006.

Likewise, the fire control computer 100 includes in its working memory a subroutine 1005 for correlating the reflected high-frequency vibrations in the form of digitized data recorded in the file 1003 with the emission signal of the high-frequency source S1 to generate a plurality of correlated high-frequency data H put into a file 1007. The correlated data B and H put into the respective files 1006 and 1007 may then be subjected to processing proper according to the nature of the information contained in this data. The correlation subroutines are conventional type correlation programs.

To this end, the digital processing and capture means 100 consisting of the fire control computer comprise in the latter's working memory a subroutine for aligning phase spectra for each of the types of correlated data, low-frequency B and high-frequency H (subroutines 1008 and 1009). Thus as represented schematically in FIG. 8 the phase spectra alignment subroutine essentially consists in a subroutine for obtaining the convolution product of the low-frequency data B by an operator representing the digitized transfer function of the corresponding low-frequency filter (a transfer function as given by equation (1) and of the correlated high-frequency data H by an operator representing the transfer function of the corresponding associated high-frequency filter. In FIG. 8 the asterisk represents the convolution product of the data in question and the operators representing the corresponding transfer functions.

Also, as shown in FIG. 8 the fire control computer 100 constituting digitized processing and capture means for the reflected vibrations includes in its working memory a subroutine for aligning the amplitude spectra of the low-frequency and high-frequency data. In FIG. 8 the amplitude spectra alignment subroutines are respectively denoted 1010, 1011 and 1012. Alignment of the amplitude spectra makes it possible to weight the amplitude spectra of the high-frequency data H and the low-frequency data B to re-establish the equilibrium of the total amplitude spectrum across the range of frequencies.

The aforementioned weighting is applied allowing for the number $NV_H$ of high-frequency sources and the number $NV_B$ of low-frequency sources, the effective emission lengths $L_B$ and $L_H$ of the low-frequency and high-frequency sources S1 and S2, for example, and the order of the additions $S_H$ and $S_B$. As shown in FIG. 8 the subroutines 1010, 1011 and 1012 are adapted to have the subroutine 1012 apply a correction coefficient K to the weighting coefficient $\beta_H$ of the high-frequency amplitudes given by equation (3):

$$\beta_H = NV_H \times L_H \times S_H$$

so that the correction coefficient K, the weighting coefficient $\beta_H$ for the high-frequency amplitudes and the weighting coefficient $\beta_B$ of the low-frequency amplitudes given by equation (4):

$$\beta_B = NV_B \times L_B \times S_B$$

satisfy equation (5):

$$K \times \beta_H = \beta_B.$$

By the effective emission length $L_B$ or $L_H$ of the low-frequency or high-frequency source is meant, according to the usual practise in the corresponding art, the emission times of these sources.

It will be understood that in the conventional way, the coefficients $\beta_H$ and $\beta_B$ being computed from physical parameters of the array, the subroutine 1012 is able by successive approximation to determine the correction coefficient K to achieve the equality mentioned in FIG. 8 in relation to the subroutine 1012 by a series of consecutive tests. This equality having been verified, the values of the weighting coefficents $\beta_B$ and $\beta_H$ for the low-frequency and high-frequency amplitudes are then applied to the low-frequency data B and high-frequency data H to obtain the new values:

$$B = \beta_B \times B$$

and $$H = \beta_H \times H$$

It will be understood that the alignment of the phase and amplitude spectra as respectively represented by the subroutines 1008-1009 and 1010-1011-1012 in FIG. 8 may be interchanged with the subroutine for aligning the phase spectra executed before the subroutine for aligning the amplitude spectra. This change is within the scope of the present invention.

Following the aforementioned processing to align the phase and amplitude spectra as shown in FIG. 8 a subroutine 1013 aligns the spatial samplings at the level of the array R for alignment by number of the data representing the low-frequency reflected vibrations relative to the data representing the high-frequency reflected vibrations. After the aforementioned processing, there are obtained at 1010 and 1011 respectively n times more data representative of the high-frequency traces H than data representative of the low-frequency traces B. To this end the computing means 100 include in their working memory a subroutine 1013 for linear interpolation of (n−1) dummy low-frequency acquisitions or data $B_i$ interpolated between two consecutive low-frequency acquisitions B. This interpolation makes it possible to combine the interpolated series of dummy data $B_i$ with the corresponding high-frequency data H.

To give a non-limiting example, the interpolated data $B_i$ may be obtained by linear interpolation according to the equation:

$$B_i = \frac{B_{p+1} - B_p}{n - 1}$$

in which $B_{p+1} - B_p$ represents the effective data recorded for two successive geophones or groups of geophones separated by the distance $n \times e$. In this case a reconstituted datum B is obtained from a datum actually recorded at a low-frequency geophone or group of geophones $B_p$ by the equation:

$$B = B_p + \alpha B_i$$

in which $\alpha$ indicates the interpolation order.

The usable signal representing the resultant echo due to the recombined high-frequency and low-frequency vibrations is obtained by means of a subroutine 1014 for recombining by summing or weighting of the high-frequency data H and the low-frequency data B, this subroutine being contained in the working memory of the computing means 100. Recovery of the optimum information $T = H + B$ is effected by adding the stream of low-frequency data B delivered by the subroutine 1013 and the interpolated low-frequency data $B_i$ to the stream of high-frequency data H.

The combination or recombination of the data H and B by adding the aforementioned stream of data may advantageously be effected by weighting low-frequency signals B and weighted low-frequency signals $B_i$ and high-frequency signals H operands. The weighting subroutine provides for, prior to such addition, the application of multiplication coefficients $\alpha_H$, $\alpha_B$ obtained from a look-up table 1015, for example, these multiplication coefficients being variable in time and representing different absorption by the environment of the reflected vibrations according to the mean frequency in the frequency band in question. It will be understood that the look-up table 1015 may be placed directly in the working memory of the fire control computer means 100, being refreshable and modifiable according to the applications considered.

In the foregoing description the programs in particular were regarded as placed directly in the working memory of the fire control computing means 100. It is to be understood that the aforementioned programs or subroutines may be placed in read-only memory or even in backing store of the aforementioned computer without departing from the scope of the present invention.

As previously mentioned, the method and device in accordance with the invention may advantageously be applied to the acquisition of terrestrial or marine seismic data, the acquisition and processing of marine seismic signals being appropriately adapted.

I claim:

1. Method of acquiring seismic data in a prospecting area comprising, in order to establish a trace, the steps of:
   (a) disposing on or over the terrestrial surface in said prospecting area an array of vibration receivers, said array including at least one row of regularly spaced receivers,
   (b) disposing in the vicinity of said array a plurality of vibration sources each adapted to emit vibrations with a frequency spectrum in a specific frequency band, the frequency bands of the spectra of said sources being adjacent and together covering the frequency band of seismic data signals, a high-frequency first source being placed at the center of said array and a low-frequency second source being placed near an end of said array, said first source emitting vibrations at a higher frequency than said second source, said first and second sources having adjacent vibration frequency spectra and being separated by a distance substantially equal to one half the length of said array,
   (c) emitting vibrations with different frequency spectra from said first and second sources,
   (d) recording said vibrations after reflection from strata beneath the terrestrial surface by means of said receivers,
   (e) moving said sources relative to said array in an acquisition direction by a trace displacement increment, and
   (f) repeated the above steps (c), (d) and (e) for a plurality of successive movements by said trace displacement increment.

2. Method according to claim 1, wherein said vibrations with different frequency spectra are emitted synchronously.

3. Method according to claim 1, wherein said second source is offset towards the exterior of said array.

4. Method according to claim 1, where said array is adapted for two-dimensional multirow acquisition and comprises a plurality of parallel rows of receivers and said vibration sources are in a line parallel to said rows of receivers.

5. Method according to claim 1, wherein said array is adapted for two-dimensional multisource acquisition and comprises a central row of receivers and parallel first and second source displacement lines.

6. Method according to claim 5, wherein a high-frequency first source is placed on said first line and a low-frequency second source is placed on said second line and said first and second sources are alternated after each trace displacement increment movement along said first and second lines.

7. Method according to claim 4, wherein said array is adapted for three-dimensional acquisition and comprises a plurality of parallel rows of receivers perpendicular to the direction in which said sources are moved.

8. Method according to claim 1, wherein to cover all or part of said prospecting area said array of receivers and said sources are moved by a displacement increment in a direction of advance.

9. Device for acquisition of seismic data in a prospecting area comprising on or over the terrestrial surface in said prospecting area:
   an array of vibration receivers; and
   a plurality of vibration sources each adapted to emit vibrations with a frequency spectrum in a specific frequency band, the frequency bands of the spectra of said sources being adjacent and together covering the frequency band of seismic data signals, said plurality of sources comprising a first source placed at the center of said array and a second source placed near an end of said array, said first source emitting vibrations at a higher frequency than said second source emissions, said first and second sources having adjacent vibration frequency spectra and being separated by a distance substantially equal to one half the length of said array.

10. Device according to claim 9, wherein said array comprises one or more rows of receivers.

11. Device according to claim 9, wherein said
   first source is adapted to emit vibrations with a frequency spectrum in a frequency band between 20 Hz and 80 Hz; and
   said second source is adapted to emit vibrations with a frequency spectrum between 8 Hz and 20 Hz.

12. Device according to claim 9, wherein each receiver comprises a set of interconnected geophones and said receivers are spaced by a specific distance.

13. Device according to claim 9, further comprising means for capturing and processing in digitized form said reflected vibrations according to their corresponding emission frequency bands, in the form of a fire control and processing computer and associated peripheral devices.

14. Device according to claim 13, wherein said capture and processing means include a working memory of said computer and in said working memory:

a subroutine commanding recording of the reflected low-frequency vibrations with a first spatial sampling whereby the geophones or groups of geophones commanded to record said low-frequency vibrations are separated by a distance $n \times e$ where e represents the distance between two adjacent groups of geophones and n is a specific integer, a subroutine for commanding recording of the reflected high-frequency vibrations with a second spatial sampling, where said second spatial sampling is denser than said first spatial sampling, the geophones or groups of geophones commanded to record said high-frequency vibrations being separated by said distance e, a subroutine for correlating said reflected low-frequency vibrations with the emission signal of said low-frequency vibrations with the emission signal of said low-frequency source to generate a plurality of low-frequency data, and a subroutine for correlating said reflected high-frequency vibrations with the emission signal of said high-frequency source to generate a plurality of high-frequency data.

15. Device according to claim 14, wherein said capture and processing means further comprise in said working memory of said computer a subroutine for aligning phase spectra of said low-frequency data and said high-frequency data.

16. Device according to claim 14, wherein said capture and processing means further comprise a subroutine for aligning amplitude spectra of said low-frequency data and said high-frequency data to enable weighting of the amplitude spectra of said high-frequency data and said low-frequency data to re-establish the equilibrium of the total amplitude spectrum across the range of frequencies.

17. Device according to claim 16, wherein said weighting is applied allowing for the number $NV_H$ of low-frequency sources, the effective emission lengths $L_B$ and $L_H$ of the low-frequency and high-frequency sources, respectively, and the order of additions $S_H$ and $S_B$, a correction coefficient K being applied to the high-frequency amplitude weighting coefficient $\beta_H$ given by the equation:

$$\beta_H = NV_H \times L_H \times S_H$$

whereby said correction coefficient K, said high-frequency amplitude weighting coefficient $\beta_H$ and said low-frequency amplitude weighting coefficient $\beta_B$ given by the equation:

$$\beta_B = NV_B \times L_B \times S_B$$

satisfy the equation:

$$K \times \beta_H = \beta_B.$$

18. Device according to claim 14 further comprising in said working memory of said computer a subroutine for linear interpolation of $(n-1)$ dummy low-frequency data acquisitions between two consecutive low-frequency acquisitions so as to be able to combine the interpolated stream of dummy data with the corresponding high-frequency data.

19. Device according to claim 18, further comprising in said working memory of said computer a subroutine for combining by summing or weighted summing said high-frequency and said low-frequency data, the optimum low-frequency plus high-frequency information being recovered by adding the stream of low-frequency data and interpolated low-frequency data to the stream of high-frequency data.

20. Device according to claim 19, wherein said computer further comprises in said working memory a subroutine for weighting low-frequency signals, weighted low-frequency signals, high-frequency signals operands, said weighting subroutine enabling prior to said addition the application of multiplication coefficients variable in time and representing different absorption by the environment of the reflected vibrations according to their mean frequency in the frequency band in question.

* * * * *

UNITED STATES PATENT AND TRADEMARK OFFICE
CERTIFICATE OF CORRECTION

PATENT NO. : 4,914,636
DATED : 04/03/90
INVENTOR(S) : Garrotta

It is certified that error in the above-identified patent and that said Letters Patent is hereby corrected as shown below:

col. 02, line 67    delete "tot" & "he" insert --to-- & --the-- col. 08, line 01    delete "o" insert --of--

Signed and Sealed this

Seventh Day of January, 1992

Attest:

HARRY F. MANBECK, JR.

Attesting Officer    Commissioner of Patents and Trademarks